US007139977B1

(12) United States Patent
Russell (10) Patent No.: US 7,139,977 B1
(45) Date of Patent: Nov. 21, 2006

(54) SYSTEM AND METHOD FOR PRODUCING A VIRTUAL ONLINE BOOK

(75) Inventor: John Russell, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1014 days.

(21) Appl. No.: 09/769,927

(22) Filed: Jan. 24, 2001

(51) Int. Cl.
*G06F 17/00* (2006.01)
(52) U.S. Cl. .................. 715/530; 715/517; 715/513
(58) Field of Classification Search .............. 715/530, 715/513, 514, 517, 531, 500.1, 522; 709/200, 709/201; 707/102, 5, 3, 2, 104.1; 434/362
See application file for complete search history.

(56) References Cited

U.S. PATENT DOCUMENTS

| | | | | | |
|---|---|---|---|---|---|
| 5,038,316 | A | * | 8/1991 | Hempleman et al. | 715/531 |
| 5,077,668 | A | * | 12/1991 | Doi | 715/531 |
| 5,159,667 | A | * | 10/1992 | Borrey et al. | 715/500 |
| 5,181,162 | A | * | 1/1993 | Smith et al. | 715/530 |
| 5,200,893 | A | * | 4/1993 | Ozawa et al. | 715/531 |
| 5,417,575 | A | * | 5/1995 | McTaggart | 434/317 |
| 5,642,520 | A | * | 6/1997 | Takeshita et al. | 704/3 |
| 5,644,776 | A | * | 7/1997 | DeRose et al. | 715/500 |
| 5,675,788 | A | * | 10/1997 | Husick et al. | 707/104.1 |
| 5,708,825 | A | * | 1/1998 | Sotomayor | 715/501.1 |
| 5,819,258 | A | * | 10/1998 | Vaithyanathan et al. | 707/2 |
| 5,835,922 | A | * | 11/1998 | Shima et al. | 715/522 |
| 5,909,207 | A | * | 6/1999 | Ho | 345/156 |
| 5,918,236 | A | * | 6/1999 | Wical | 715/500 |
| 5,963,205 | A | * | 10/1999 | Sotomayor | 715/531 |
| 5,970,505 | A | * | 10/1999 | Ebrahim | 715/501.1 |
| 5,978,818 | A | * | 11/1999 | Lin | 715/501.1 |
| 6,023,715 | A | * | 2/2000 | Burkes et al. | 715/514 |
| 6,064,384 | A | * | 5/2000 | Ho | 715/839 |
| 6,065,026 | A | * | 5/2000 | Cornelia et al. | 715/531 |

(Continued)

OTHER PUBLICATIONS

R. Hoch,"Using IR Techniques for Text Classification in Document Analysis", 1994, Proc. SIGIR-94.*

(Continued)

*Primary Examiner*—William Bashore
*Assistant Examiner*—J H Blackwell
(74) *Attorney, Agent, or Firm*—Park, Vaughan & Fleming, LLP (57) ABSTRACT

A system and method are provided for generating a virtual book from a set of electronic documentation. From the documentation, a set of topics (e.g., headings) are copied and saved, along with references to their locations in the documentation. The hierarchy of documentation topics is also recorded so that from one topic, its parent and/or children can be easily reached. The topics are classified into one or more categories (e.g., concept, task, example, reference, troubleshooting) identifying general (and/or specific) types of information. When a subject for a virtual book is received, the topics are searched for those relevant to the subject. A virtual book is then assembled to contain the relevant topics, which may be grouped by category. Within a category, topics may be listed in alphabetical order, in order of relevance, in the order they appear in the documentation or within a given book, etc.

20 Claims, 3 Drawing Sheets

U.S. PATENT DOCUMENTS

| | | | | |
|---|---|---|---|---|
| 6,229,502 | B1* | 5/2001 | Schwab | 345/1.1 |
| 6,320,591 | B1* | 11/2001 | Griencewic | 345/582 |
| 6,370,553 | B1* | 4/2002 | Edwards et al. | 715/514 |
| 6,377,947 | B1* | 4/2002 | Evans | 707/5 |
| 6,397,231 | B1* | 5/2002 | Salisbury et al. | 715/515 |
| 6,446,093 | B1* | 9/2002 | Tabuchi | 707/205 |
| 6,486,895 | B1* | 11/2002 | Robertson et al. | 715/776 |
| 6,598,046 | B1* | 7/2003 | Goldberg et al. | 707/5 |
| 6,606,620 | B1* | 8/2003 | Sundaresan et al. | 707/3 |
| 6,638,317 | B1* | 10/2003 | Nakao | 715/530 |
| 6,671,693 | B1* | 12/2003 | Marpe et al. | 707/102 |
| 6,757,887 | B1* | 6/2004 | Kaplan et al. | 717/106 |
| 6,769,096 | B1* | 7/2004 | Kuppusamy et al. | 715/530 |
| 6,826,724 | B1* | 11/2004 | Shimada et al. | 715/500 |
| 6,845,485 | B1* | 1/2005 | Shastri et al. | 715/530 |
| 2001/0042085 | A1* | 11/2001 | Peairs et al. | 707/526 |
| 2001/0042087 | A1* | 11/2001 | Kephart et al. | 707/530 |
| 2002/0010708 | A1* | 1/2002 | McIntosh | 707/500 |
| 2002/0184267 | A1* | 12/2002 | Nakao | 707/515 |
| 2003/0018659 | A1* | 1/2003 | Fuks et al. | 707/500 |
| 2003/0221166 | A1* | 11/2003 | Farahat et al. | 715/513 |
| 2004/0201569 | A1* | 10/2004 | Seet et al. | 345/156 |
| 2004/0261016 | A1* | 12/2004 | Glass et al. | 715/512 |

OTHER PUBLICATIONS

B. Krulwich,"Learning User Interests Across Heterogeneous Document Databases", 1995, AAAI Spring Symposium on Information Gathering.*

Krulwich et al.,"The InfoFinder Agent: Learning User Interests Through Heuristic Phrase Extraction", Sep./Oct. 1997, IEEE Expert.*

McGraw-Hill Primis Custom Publishing (www.mhhe.com/primis), archived circa 1998, via the Wayback Machine (www.archive.org) pp. 1-12.*

Microsoft Powerpoint presentation presenting how to use Primis Online (http://www.mhhe.com/primis/Primis_Online.pdf), archived Jul. 21, 2004, via the Wayback machine (www.archive.org), 16 pages.*

Mayfield et al.,"Read a Good E-Textbook Lately?", Aug. 15, 2000, Wired News 4 pages.*

Seybold Report,"RRD Provides Thompson with Custom Textbooks and Web-Enabled Archives", Jan. 1, 1999, pp. 1-7 and blowups of screendumps contained in article.*

O'Reilly,"SafariU, Your Course-In Print, On The We—Your Way", brochure for service, date unknown, 6 pages.*

O'Reilly,"SafariU Beta, FAQ about SafariU", Sep. 30, 2004, archived via Wayback machine FAQ includes Quicktime video on how to use 6 pages.*

McGraw-Hill,"eBooks in Higher Education: What We Have Learned . . . Where are We Going?", powerpoint presentation 29 pages.*

* cited by examiner

SYSTEM AND METHOD FOR PRODUCING A VIRTUAL ONLINE BOOK

BACKGROUND

This invention relates to the fields of computer systems and online documentation. More particularly, a system and methods are provided for producing a virtual online book from a compendium of electronically stored documentation.

Documentation for software and other computer-related products has traditionally been produced and delivered in hard-copy form (e.g., books, manuals). More and more frequently, however, documentation is being delivered in electronic form—as PDF (Portable Document Format), HTML (HyperText Markup Language) or other files. Unfortunately, even when possessed in electronic form, finding desired information in a large collection of product documentation, which may span multiple books, volumes, manuals, and so on, can be difficult and frustrating.

Documentation grows as a product evolves (e.g., to augment a portion dealing with an expanded feature) and often fragments as well (e.g., to pull out material for a separate book or manual on a particular topic). The documentation may, however, lose some of its cohesiveness or completeness, for example, to the point where a user does not know which of multiple books contains the information he or she seeks. Although a user may be familiar the topics addressed in one book or manual, if it was decided that a closely related topic should be addressed in a different book, the user may never become aware of the related topic.

Simply searching for specific words or phrases may return many uses of the words/phrases that are unrelated to the desired context, and may return them in an order that frustrates the user's search. For example, a user may be searching for an introductory or conceptual description of a particular command (e.g., what the command does) but the search tool may present portions of the documentation dealing with the syntax or examples instead. Further, the organization of product documentation (both hard-copy and electronic forms) may stymie a user's attempts to find conceptual information by making him or her search through several separate books or files, each of which contains conceptual information concerning different aspects of the product. And, because search tools often fail to analyze their results for relevance, a user may initially select search results leading her to sources that she is familiar with, over a source that she is not familiar with, even though the information she seeks is located in the unfamiliar source.

Efforts to make electronic or online documentation more user-friendly have involved efforts such as tagging portions of the documentation with key words or phrases (e.g., for use by a search engine) and embedding identifiers of the type of information contained in particular topics or sections of the documentation (e.g., conceptual, advanced, troubleshooting). The number of tags and identifiers that can be embedded may be limited, however, and the flexibility of searches and comprehensiveness of search results are limited by the authors' assiduity in their tagging and identification efforts. Further, topics may be misclassified or their appropriate classifications may change over time. Correcting or changing the corresponding tag(s) embedded in the document source code may involve significant time and/or effort.

Online documentation is often stored in smaller units than their hard-copy counterparts. For example, where one hard-copy book may include a dozen top-level topics, the online version may span many files, with each file dedicated to a single second- or third-level topic. This facilitates printing of the online documentation, but the results of a search of the online documentation may include extensive chains of links that a user must follow to find his or her desired information.

Existing methods of producing or presenting electronic or online documentation continue, however, to overwhelm a user with extraneous, irrelevant and/or duplicate information or fail to prevent sufficient information to meet the user's needs.

SUMMARY

In one embodiment of the invention a system and methods are provided for producing a virtual online or electronic book of documentation in response to a user's request. The virtual book is derived from a larger set, or library, of documentation that may span any number of electronic books, volumes, files, etc.

The electronically stored documentation is processed, possibly in several phases, to identify the topics within each volume, book, chapter, section, etc. Each topic may be identified as a heading (e.g., a chapter title, a section heading) at a particular level (e.g., top-level, second level). The hierarchy of documentation topics is recorded so that parent/child(ren) of each topic, and their locations, are known.

In one embodiment, a topic/heading is then placed into one or more categories such as: concept, task, example, troubleshooting, reference, etc. Then, when a user specifies or selects a subject of interest (e.g., a search topic), the documentation topics that are relevant to that subject (e.g., as determined by word matching or tags associated with the headings) are grouped according to their categories and presented as a virtual book. Within a given category, relevant topics may be listed alphabetically, in their order of relevance, in the order they appear in the books from which they are drawn, may be grouped according to those books, etc.

The user may select a particular category and then browse the relevant topics, which comprise links to the documentation text. When the user selects a topic, he or she is taken to the corresponding text and links may be provided to allow him or her to traverse the text, return to the virtual book, etc.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity. Although one or more embodiments are described in the context of an online network environment, other embodiments of the invention may be implemented on isolated or individual computer systems.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention, a system and method of producing a virtual electronic book are provided. Illustratively, the contents of the virtual book are drawn from a larger set of documentation that, due to its size or scale may overwhelm or intimidate a user attempting to find a particular piece of information or information concerning a particular topic. Because the contents of the virtual book may be drawn from the entire documentation set, the user does not need to know which portion of the documentation (e.g., volume, chapter, section, file) contains or should be searched for the desired information.

Advantageously, because the contents are modeled after the well-understood form of a book's table of contents, a user can skim a large set of search results or focus on the portion(s) that is/are most relevant to him or her.

Illustratively, the virtual book may include links into the documentation to allow the user to access the documentation text described in the virtual book, browse the documentation set, print portions of the documentation, etc. The unique manner in which the virtual book is assembled allows it to be customized or targeted to the user's particular interest or need, at the appropriate level of detail (e.g., in accordance with their role and/or level of experience with the specified topic).

A virtual book may be composed and stored in anticipation of a user's need (e.g., for often-requested topics) or may be generated in real-time in response to a user request. The user may select one of a list of pre-determined topics or enter his or her own search topic or topic of interest (e.g., as one or more key words or phrases). The system may apply some intelligence to include closely related topics or to expand a search for a given word to include synonyms of the word.

One method of producing a virtual electronic book may begin with documentation stored as a set of HTML (HyperText Markup Language) files or files adhering to another compatible file format, such as SGML (Standard Generalized Markup Language), XML (extensible Markup Language), Javadoc, RFT (Rich Text Format), or any other format that can be made available as a plain text file. In this method, the documentation files are parsed or scanned to find entities that may be used to organize the virtual book and represent portions of the documentation text. In particular, headings (e.g., chapter titles, headings of sections or sub-sections, captions for diagrams or illustrations, headings for tables and other figures) may be extracted and processed as described below. Each heading may represent one topic within a section, chapter, volume, or other portion of the documentation. Indices, glossaries, tables of contents and other such entities, or entries within such entities, may also be scanned, extracted and/or processed. Yet further, in one embodiment of the invention the documentation text itself may be scanned, searched or otherwise processed during the compilation of the virtual book.

During one phase of processing information extracted from the documentation for the virtual book, headings (and/or other entities) are assigned to one or more categories based on their associated topics. Thus, in this embodiment a heading's categories identify the type of information addressed in the heading (and the corresponding portion of the documentation). In particular, the heading for a chapter or section of the documentation may be assumed to describe the textual contents of that chapter or section. Illustrative categories in one embodiment of the invention may include: concept (e.g., dealing with basic or introductory levels of detail), task (e.g., addressing how to accomplish a particular task), example (e.g., providing an example), reference (e.g., facts or details useful for reference purposes), troubleshooting, index, glossary, bibliography, etc.

The processing phase may draw upon tags or identifiers embedded within the documentation (e.g., HTML tags) to determine suitable categories. For example, an author of a set of documentation or a portion (e.g., one book) of a documentation set may embed tags in the headings, text or elsewhere for the purpose of aiding searches. However, in a present embodiment such tags are unnecessary because the headings are analyzed according to a set of rules (described below) for determining their appropriate category or categories. As one example, a heading that includes text such as "How to . . . " or that includes a verb in gerund form may be assigned to the task category.

Categories are not mutually exclusive. That is, a given heading may be assigned to multiple categories. Further, unlike in existing manual efforts to classify documentation (e.g., by embedding tags or other identifiers), the category attributes assigned to a documentation topic or section may be given a range of values (e.g., "highly" conceptual, "slightly" conceptual). Embedded tags allow only binary assignment of attributes (i.e., either a topic is conceptual or it is not).

Thus, headings may also be ranked or ordered, within or across categories. For example, in the conceptual category they may be ordered from most conceptual to least conceptual; in the task category they may be ordered alphabetically by task; across all categories, by the order in which they appear in the documentation. The virtual book may then be assembled with all or a portion (e.g., the most relevant) of the headings, and each heading may include or be accompanied by a link to where it appears in the documentation, links to related information (e.g., a broader or narrower topic), a link to a virtual book for a related topic, etc.

In one embodiment of the invention the virtual book may be customized to the type of user for which it is being constructed (e.g., a database administrator, a software developer, a general user) and/or their level of experience (e.g., novice, intermediate, expert). A user's role or level of experience may already be known to the system or may be ascertained by their responses to one or more predetermined questions. A virtual book constructed for someone deemed a novice could, for example, include a larger concept section, while a virtual book assembled for an expert may omit or sharply limit the size of the concept category and instead focus on the reference, example, or troubleshooting categories.

Figure 1A:
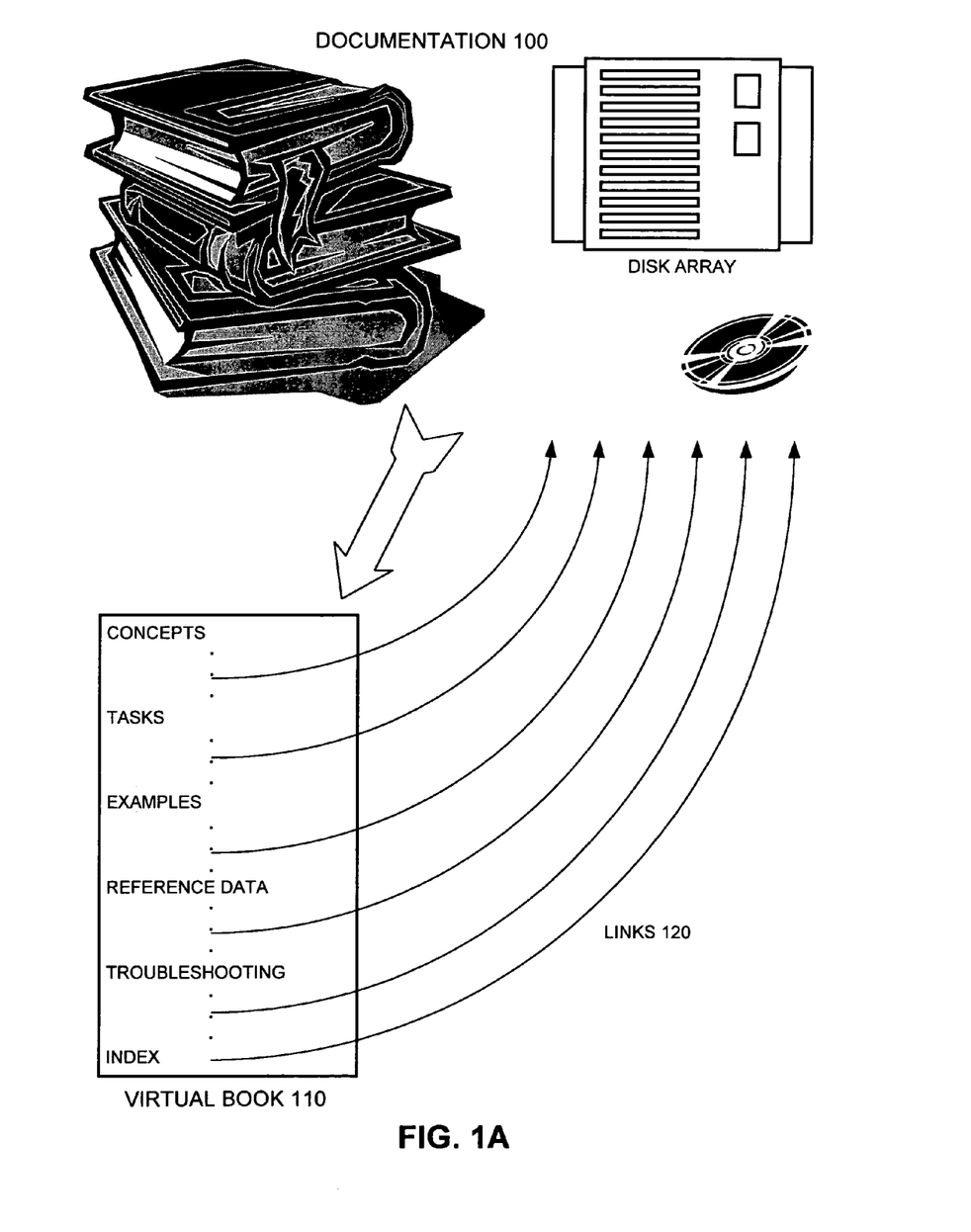
FIG. 1A is a block diagram depicting the generation of a virtual book in accordance with an embodiment of the present invention.

FIG. 1A depicts the compilation of virtual book 110 from a set of documentation 100 in one embodiment of the invention. The documentation may comprise multiple books, manuals, guides, volumes, chapters, and so on, but is stored electronically on compact disc, magnetic disk drive(s), etc. Virtual book 110 is assembled in a manner that facilitates a user's access to particular types or categories of information within the documentation. In this embodiment, for each entry in a category a pointer or link (e.g., hyperlink) 120 is maintained to the corresponding portion of the documentation, which may be a separate book, chapter, section (or sub-section), diagram, table, glossary, index, etc. The documentation text may be maintained as flat text, HTML or in some other form and may be presented to a user through a web browser, word processing software or other user interface.

Figure 1B:
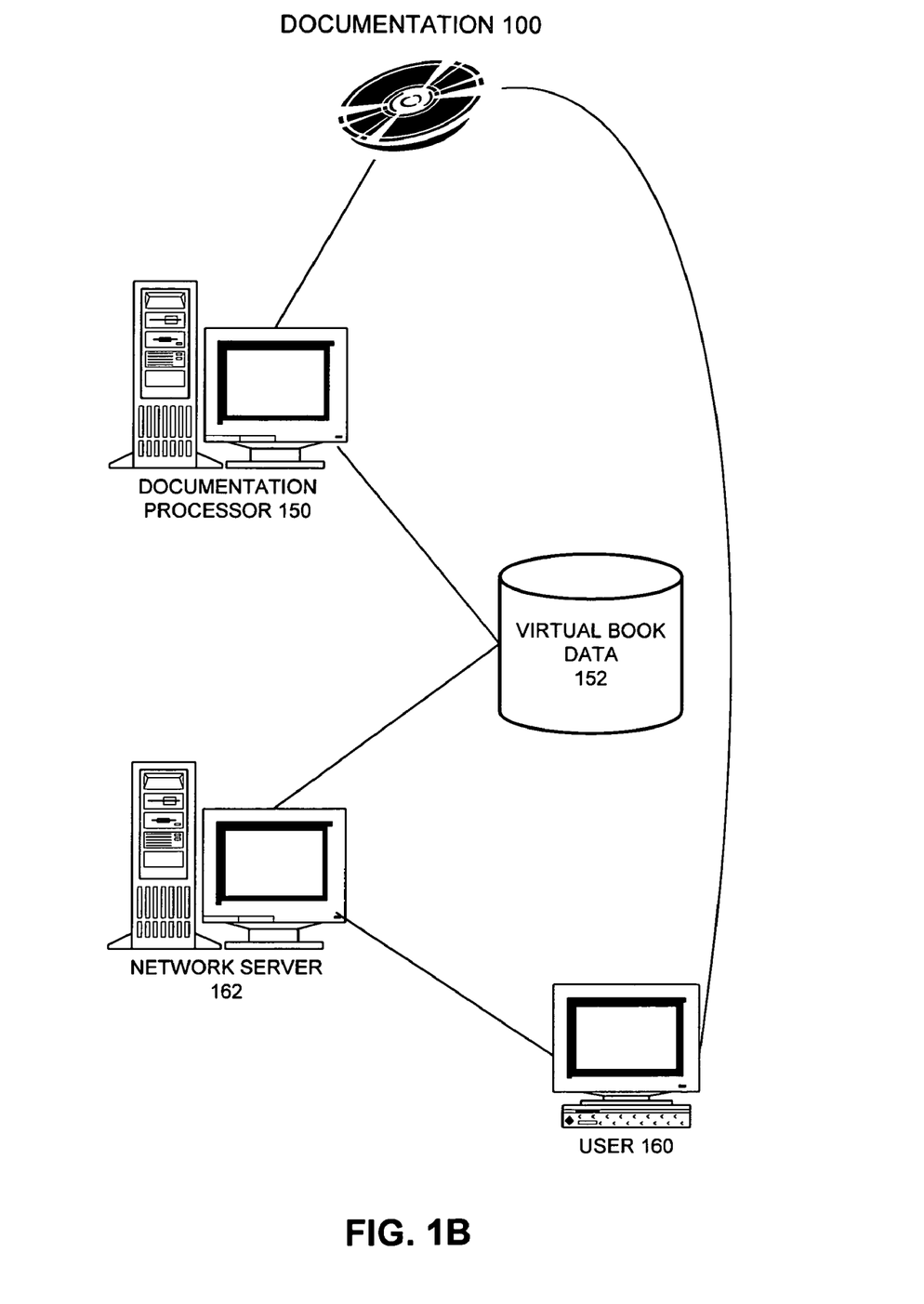
FIG. 1B depicts a system in which a virtual book may be generated in response to a client request, in accordance with an embodiment of the invention.

FIG. 1B depicts a system configured to generate a virtual book in response to a user request in a present embodiment of the invention. In this embodiment, documentation 100 is stored on a compact disc or other storage device. Documentation processor 150 scans or parses the documentation to identify or retrieve headings and/or other entities and stores them in database 152, which may be accompanied by a database server. Illustratively, text from documentation 100 may also be stored in the database.

Network server 162, which may be a web server or application server, is configured to receive a request for a virtual book from user 160. In this embodiment the user may initiate a request by submitting a search for a particular topic, phrase or key word(s). When the request is received, the topic for the virtual book is passed to database 152. Stored procedures within the database, or procedures executed by a database server operating in conjunction with the database, assemble the virtual book by categorizing the stored headings and/or other entities (if they are not already categorized). The headings within a category may be ordered according to their relevance to the topic and/or category, in alphabetical order, in the order they appear in the documentation, or according to some other ranking. Links are established from the headings to their corresponding documentation portions so that the user may easily access the pertinent text when he or she selects a heading.

A table of contents may be presented at the front of the virtual book to allow the user to quickly jump (e.g., via links) to the individual categories. Glossary entries that are relevant to the user's topic may be presented in a separate category or section of the virtual book, or may be included in another section (e.g., the concepts section). Similarly, a separate index section may be included in the virtual book, and may comprise relevant index entries from documentation 100. Index entries may thus be one of the types of entities, along with headings, that are extracted from documentation 100 by processor 150. Other entities may include glossary entries, tables of content, footnotes, etc.

If the system is aware of the user's role and/or level of experience, which may be elicited from the user as part of the virtual book request process, the virtual book may be tailored accordingly.

During the initial processing of a documentation set (e.g. by processor 150 of FIG. 1B), the documentation may be analyzed one book or manual at a time. Each book may comprise multiple files, thus requiring each file to be identified and visited. For each book, headings, index entries, glossary items, a table of contents and/or other entities may be identified, recorded and/or stored in a database. Illustratively, processing one book at a time allows the system to learn the book's structure and the order of its headings or topics. Therefore, when a book is processed the system determines which headings are top-level headings (e.g., relating to chapters), which are second-level headings (subchapters or sections), and so on. With this knowledge of a book's structure, the headings within a virtual book may be ordered accordingly (e.g., in a virtual book). And, when a section of the documentation is accessed through a virtual book (e.g., following a link from the virtual book), the system will know what upper-level section precedes that section, what section follows the section, and so on, thereby allowing the user to traverse the documentation (e.g., with links for "back" and "forward"). The entities within one book of the documentation may be stored separately in the database or multiple books' entities may be stored together. For each entity, enough information is stored to locate it or retrieve its associated documentation text (e.g., file name, unique anchor name within an HTML file).

In a present embodiment of the invention, two sets of data files are stored in the database for the documentation. In this embodiment, one set of files includes the headings of documentation topics and the other stores index entries. Each set may include one or more separate files (e.g., one file for each book or volume of the documentation). Thus, the system stores the text of each heading and index entry, where they are located in the documentation (e.g., book, file), what headings or index entries precede and follow a given heading or index entry, etc. The system may be configured to store (for presentation to the user) any number of levels of index entries in a virtual book. In alternative embodiments of the invention additional data files may be created to separately store glossary entries, tables of contents, etc., or any of these entities may be included with other entities.

In one embodiment of the invention, if a book or set of documentation files does not include its own index (e.g., the author of the book did not compile one), the system may generate an index for the book. In this embodiment, index entries may be created for predetermined topics (if found in the book), or the system may use some other criteria. For example, the system may try to create an index for this book using index entries extracted from one or more other books in the documentation set.

Illustratively, the headings, index entries and any other entities may be stored in the database in one or more schemas. Thus, a schema may be initially populated with any or all of: the extracted topic headings and index entries, links to their locations in the documentation files, their level within their respective books, links forward and backward in their books, etc. In the presently described embodiment, the schemas are configured to store other information that will be generated through further analysis of the entities. For example, the schemas will also store each heading's category or categories.

For each book heading that is processed, the system obtains the text and its level. In addition, a tag or identifier indicating a purpose or nature of the heading may be extracted if the book was created with such tags. For example, in an HTML file a tag may be stored as a class attribute. As described above, a tag may identify a heading as a glossary entry, an error message, a figure caption, a book title, etc. The document processing system or module may use a tag when categorizing a heading, may ignore them, may assign additional categories, etc.

If a heading does not include a tag, or if the system is configured to categorize headings even if they are tagged, then the system analyzes the headings (as described below) to determine the appropriate category or categories in which they should be included. Illustratively, the category(ies) assigned to a given heading, whether through analysis of the heading or from an extracted tag, may be inherited by the text and/or lower-level headings that follow the heading. In one embodiment of the invention a heading may be assigned into any number of the following categories: concept, task, example, reference and troubleshooting.

In one embodiment of the invention a virtual book may be presented to a user as a list of categories or a table of contents (where each entry in the table identifies a category). An entry in the table of contents or an entry for a category may comprise a link to a section of the virtual book in which the headings for a particular category are listed. Within the chosen section, each heading may then include a link to the text, figure, footnote or other portion of the documentation that follows or is associated with the heading. If a heading is chosen, the associated documentation portion may be presented in a manner (e.g., via a browser, with forward and backward links) that allows the user to quickly access the documentation that precedes or succeeds the present portion, return to the list of headings, access a form of the documentation suitable for printing, etc.

A virtual book may be pre-compiled, perhaps in anticipation of a user request or as part of a virtual library. As one alternative, a virtual book may be generated when a user submits a request for information or commences a search for a particular topic. The topic may be expressed textually by the user or may be selected from a list of common topics.

When a topic or subject for a virtual book is specified, an analysis phase commences and uses the data stored during the processing phase to help determine the appropriate categories to assign to them to. All or a subset of the stored headings may be processed in this manner. For example, just those headings that are related to the subject, or just those that appear within a book or higher-level section that is related to the subject, may be categorized. Illustratively, a heading may be included in a group of headings to be categorized if the subject of the virtual book is included in the title of the book in which the heading is drawn from, if the subject matches or includes a keyword, phrase or tag associated with the heading or the heading's book or section, etc.

In an alternative embodiment of the invention, headings may be categorized before the subject for the virtual book is received. In this embodiment, when the subject is identified the headings are searched for those that are relevant to the subject.

In one embodiment of the invention, a heading may be considered "conceptual" and assigned to the concept category if it is drawn from an introductory book (a book having a title such as "Concepts" or "New Features") or an introductory chapter or section (entitled "Introduction to . . . ," "Frequently Asked Questions About . . . ," etc.). Further, a heading may be considered conceptual if it includes particular words or phrases (e.g., "introduction," "concepts," "architecture," "features," "benefits") or ends in a question mark, which may indicate a frequently asked question or accompany a heading such as "What Is/Are . . . " or "Why Use . . . ," etc. Glossary entries that match a user's topic may be considered conceptual and thus included in the conceptual section of the virtual book, or may be assembled in a separate section. Conceptual headings may be grouped (in the virtual book), according to the documentation book in which they appear, with each group being led by the title of the book. Further, exclusively conceptual books may be listed first, and others (e.g., those that are only partially conceptual) may be listed alphabetically or in some other order. Illustratively, within one book's group of conceptual headings, the headings may be listed alphabetically.

In one embodiment of the invention, a heading may be considered a "task" if it starts with a verb in the gerund form or with a phrase such as "How To . . . ," "How Do . . . ," etc. Task-oriented headings may be presented as a separate section of the virtual book, in an alphabetically ordered list, in order of their relevance (e.g., ranked by how closely they match the topic of the virtual book), or in some other order. Illustratively, if the number of task headings meets or exceeds a threshold or, regardless of the number of task headings, they may be preceded by shortcut links. Such shortcut links may reflect the unique first X (e.g., two or three) letters of the tasks. Thus, all task headings having the same first X letters may be quickly accessed by selecting the shortcut link matching those letters.

In a present embodiment of the invention, a heading may be considered to be an "example" if it includes a word such as "sample," "example," "demonstration," etc. Also, during scanning or parsing of the documentation, the system may categorize a heading as an example if it contains or appears to contain an example program listing or pseudo-code. Further, a heading that accompanies a figure or diagram may be classified as an example. Because many headings may simply appear as "Example," in order to differentiate one heading from another in the virtual book, example headings may be presented with their text (e.g., "Example") merged with the text of their parent heading, and may be grouped according to the books in which they appear.

In one embodiment of the invention, headings may be included in the "reference" section of a virtual book if they appear within a reference book (e.g., having the word "Reference" in the title). Also, if the heading text ends with "Statement," "Function," "Method," "Class," etc., it may be considered a reference. Further, a heading may be classified as reference if its syntax or text has a particular notation or format or if it includes words or phrases that match programming commands, functions or procedures. For example, many programming languages (e.g., Java, C++) frequently use particular characters such as "(" and ")", and in database programming, SQL (Structured Query Language) is usually written in all capital letters. Reference headings may be grouped (in the virtual book) by books from which they are taken. The most relevant books or headings may be listed first, with others presented alphabetically or in some other order.

In assembling a "troubleshooting" section of a virtual book, in one embodiment of the invention a heading may be included in this section if it includes words such as "avoiding," "conflict," "deadlock," "debug," "diagnostic," "error," "exception," "failure," "problem," "restriction," "trouble," etc. Troubleshooting headings may be presented in groups, according to their respective books. As with the other categories/sections, the most relevant book(s) may appear at the top of the troubleshooting section, and/or the most relevant headings may be listed first among a book's headings.

In one embodiment of the invention, a virtual book may include a separate index section that contains entries that are relevant to the topic and drawn from all of the books included in the documentation set. Illustratively, each relevant top-level index may be listed in alphabetical order or some other order (e.g., according to the book from which they are taken), and may be accompanied by one or more sub-level entries. For example, a top-level index entry of "Database" may be relevant to virtual book subject expressed as "creating a database." If included in the index section of the virtual book, this index entry may be accompanied by a second-level index entry of "Creating" and third-level entries of "Automatically" and "Manually." Because of the large number of index entries that may be included in the index section, shortcuts may be placed at the top of the index section to allow the user to quickly access the index entries based on their first X (e.g., one, two, three) letters.

In one embodiment of the invention, a virtual book may include a bibliography configured to facilitate a user's access to the underlying documentation from the virtual book. In particular, multiple portions of a given book within the documentation may be included as different headings in different sections of a requested virtual book. For example, a virtual book having a subject of "Triggers" may include headings for "Introduction to Triggers" (e.g., concept section) and "Debugging Triggers" (e.g., troubleshooting section), which may be widely separated in the virtual book even though they are drawn from the same book in the documentation set. Illustratively, the bibliography may list each book from which one or more headings were included in the virtual book, with the chapters of the book from which the headings were drawn. This may facilitate the user's identification of, and access to, the portions of the documentation containing pertinent information. The bibliography may include links into the documentation (e.g., for the identified books and chapters) that the user may follow (e.g., for browsing or printing purposes).

Besides the criteria discussed above, a given heading may be categorized based on tags, identifiers or markers associated with it, and/or may inherit a category from the parent or next-higher level heading under which it appears.

Figure 2:
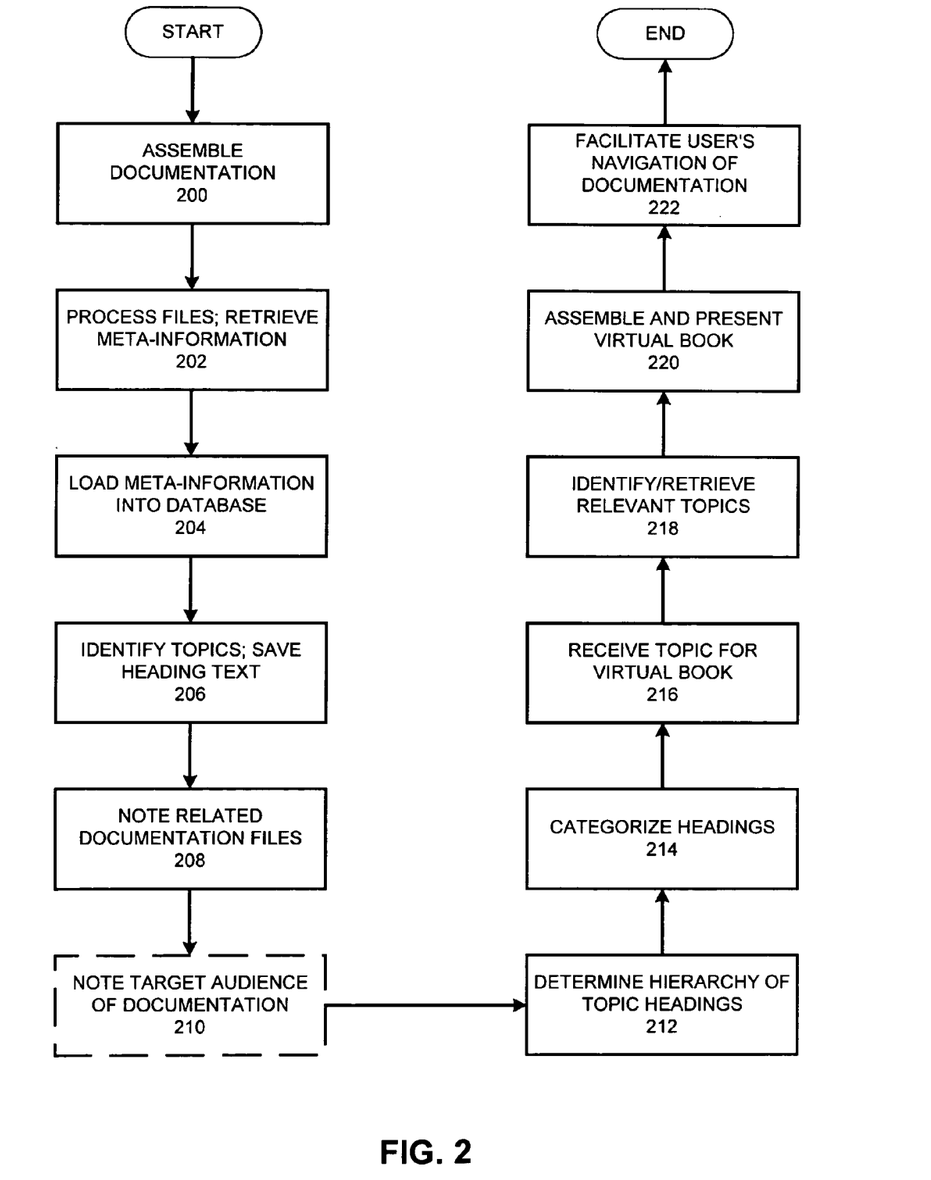
FIG. 2 is a flowchart illustrating one method of generating a virtual book in accordance with an embodiment of the invention.

FIG. 2 illustrates one method of generating a virtual electronic book according to one embodiment of the invention. In this illustrative method, a set of online or electronically stored documentation comprises multiple books or volumes, each of which may comprise multiple files.

In state 200, the documentation files are created or gathered. To facilitate presentation of the documentation to a user when a virtual book is generated, the files may be stored in a location easily accessible to the network server (e.g., web or application server) that receives and processes a user's request for a virtual book.

In state 202 the files are processed to gather meta-information such as: directory and file names, anchor names, section titles, heading levels (e.g., how many levels of headings are contained in a file), locations of indices, glossaries and other entities, etc. The collected meta-information is intended to reflect various physical attributes of the files that may be useful in identifying and categorizing the topics within the documentation as well as facilitating retrieval of the documentation for presentation to a user.

In state 204 the meta-information is loaded into a database. One embodiment of the invention is configured for use with a database such as Oracle Server (by Oracle Corporation). In this embodiment, Perl scripts may be used to gather the meta-information and the SQL*Loader utility may be used to load it into a database.

In state 206, each documentation file is processed to identify the topics (e.g., headings) it contains. Headings may be identified by tags embedded in a file, by their format or via some other indicia. For each file, data concerning the number of topics and their text may be recorded. In addition, each topic may be assigned a unique number or other identifier.

In state 208 related files are identified and their relation is recorded. In the illustrated embodiment of the invention, all files within a single book or volume of the documentation are identified. In other embodiments, files may be grouped by chapters or some other criteria.

In optional state 210, information regarding a target or suitable audience for a book or other portion of the documentation is recorded. Thus, for a book entitled "Application Developer's Guide," a notation may be made that the topics with the book are suitable for software developers. Audience information may be derived from the title of a book, the grouping of a book with other books intended for the same audience, from tags or other identifiers provided by an author, etc.

In state 212, the hierarchical structure of headings/topics within each book, volume or other division of the documentation is noted. In particular, the parent, child(ren) and/or sibling(s) of each heading, if any, are recorded so that when a particular heading included in a virtual book is selected by a user, the appropriate links may be provided to allow the user to traverse the documentation in either direction. For example, a given heading within a book may be preceded by other headings that are at the same level (e.g., siblings). In this state, the system records where the given heading's parent is located, whether it is one heading before it or several.

In state 214 the headings/topics are categorized. In particular, linguistic analysis may be applied to classify each heading as concept, task, example, reference, troubleshooting, index, etc. More than one category may be assigned to a given heading. The analysis applied in this state may employ information learned earlier in the procedure. For example, a volume, book, chapter, section or other portion of the documentation may be tagged, titled or otherwise identified as being of a particular type (e.g., reference section, bibliography, "Glossary," "Introduction to . . . ").

In state 216, a topic of interest for a virtual book is received from a user. The topic may be expressed as a word or words, as a target of a search, may be selected from list of popular or useful topics, etc.

In state 218 headings/topics that are relevant to the user's topic of interest are assembled into a virtual book. The virtual book may be prepended with a header (which may introduce the notion of a virtual book, indicate how to use it, etc.) or otherwise inform the user how to navigate it. Illustratively, within each section of the book (where each section corresponds to one category), the headings/topics within the corresponding category may be listed in virtually any order (e.g., alphabetically, by relevance to the user's topic, grouped by the books in which they appear, in the order they appear within a book).

In state 220 the virtual book is presented to the user. The virtual book may be presented first as a table of categories or table of contents allowing the user to select a category, after which the user is presented with the headings/topics within the category. In one alternative embodiment, the user may be initially offered a list of books or volumes within the documentation. For example, an expert user may know exactly which book contains the information he needs. After selecting the book, then the separate categories of headings found within that book may be presented.

In state 222 the system facilitates the user's access to the documentation he or she seeks, by providing links forward and backward (e.g., through the hierarchy of headings/topics) and back to the virtual book. After state 222, the illustrated procedure ends.

One skilled in the art will appreciate that other suitable procedures for producing a virtual book may be derived from the preceding without exceeding the scope of the present invention.

In one alternative embodiment of the invention in which it is desired to also search documentation text for a user's topic, separate files may be created (permanently or temporarily) to store documentation text corresponding to headings/topics. For example, for the headings identified within a particular book, separate files may be created and populated with the heading and the accompanying documentation text. Then, the files may be searched for the user's topic and, if found in a particular file, the corresponding heading and book may be easily identified in order to create a link to the text. The link may be constructed to either the separate file or the original documentation (e.g., to an anchor placed at the appropriate point in the documentation).

In another alternative embodiment of the invention, documentation headings/topics may be additionally categorized according to suitable audiences for portions of the documentation (e.g., volumes, books, chapters, sections). Such categories may include administration (e.g., database administrator), application development, etc. In further embodiments, various other specialized or sub-categories, at high or low levels of granularity, may be employed. Thus, specific administration interests may be reflected as specialized categories for backup procedures, adding a new user, etc.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. An method for composing a virtual book from a set of electronically stored documentation comprising multiple books, the method comprising:
    automatically and under computer control parsing said electronically stored documentation to gather meta-information representing physical attributes of said electronically stored documentation;
    automatically storing said meta-information in a database;
    automatically identifying a plurality of topics based on said meta-information and the chapter and section headings in the documentation, wherein each said topic is associated with a portion of the documentation;
    automatically determining a structure of the documentation, wherein said structure indicates a hierarchy of said topics within the documentation;
    automatically classifying each of said topics within one or more categories;
    receiving a subject for a virtual book;
    automatically using said topics and said meta-information to compose said virtual book to include a subset of said topics that are relevant to said subject, and each said relevant topic includes a pointer to said associated portion of the documentation, wherein the complete virtual book can be stored for future access.

2. The method of claim 1, further comprising searching said topics for a set of topics relevant to said subject.

3. The method of claim 1, wherein said relevant topics are grouped in said virtual book by said categories.

4. The method of claim 3, wherein said relevant topics within a first category are listed in the order of their relevance to said subject.

5. The method of claim 3, wherein said relevant topics within a first category are listed in the order they occur within the documentation.

6. The method of claim 1, further comprising identifying index entries in the documentation.

7. The method of claim 6, wherein said index entries are included in said virtual book.

8. The method of claim 1, further comprising sorting said relevant topics according to their relevance to said topic.

9. The method of claim 1, wherein said categories include one or more of the set of: concept, task, example, reference and troubleshooting.

10. The method of claim 1, wherein said composing comprises:
    identifying a characteristic of a viewer of said virtual book; and
    customizing said virtual book for the viewer on the basis of said characteristic.

11. The method of claim 10, wherein said characteristic is one of the set of: employment role and level of experience.

12. The method of claim 10, wherein said characteristic comprises a level of experience of the user and said customizing comprises omitting one or more of said categories from said virtual book.

13. The method of claim 10, wherein said characteristic comprises an employment role of the user and said customizing comprises implementing said role as another category of said virtual book.

14. A computer-implemented method for generating a virtual electronic book from a set of electronic documentation comprising multiple books stored in multiple files, comprising:
    automatically parsing said electronic documentation to gather meta-information representing physical attributes of said electronic documentation;
    storing said meta-information of the multiple files in a database;
    automatically identifying topics based on said meta-information and the chapter and section headings within the documentation, wherein each said topic comprises a heading within one of the multiple files;
    automatically associating unique identifiers with each of said topics;
    automatically storing said topics in said database;
    for each of said stored topics:
    automatically storing in said database a reference to a first book containing said topic;
    automatically storing in said database a reference to a first file containing said topic;
    automatically storing in said database a reference to a parent topic of said topic, if any, in the first book; and
    automatically storing in said database a reference to a child topic of said topic, if any, in the first book;
    automatically categorizing each of said stored topics into one or more pre-determined categories, wherein each of said categories represents a type of topic;
    receiving a subject for a virtual book;
    automatically searching said stored topics for topics relevant to the subject;
    automatically presenting said virtual book to a viewer, wherein said virtual book comprises said relevant topics grouped according to said categories and said meta-information; and automatically storing said virtual book for future access, wherein the complete virtual book can be stored.

15. A computer readable storage medium storing instructions that, when executed by a computer, cause the computer to perform method for composing a virtual book from a set of electronically stored documentation comprising multiple books, the method comprising:
- automatically parsing said set of electronically stored documentation to gather meta-information representing physical attributes of said electronically stored documentation;
- automatically storing said meta-information in a database;
- automatically identifying a plurality of topics based on said meta-information and the chapter and section headings in the documentation, wherein each said topic is associated with a portion of the documentation;
- automatically determining a structure of the documentation, wherein said structure indicates a hierarchy of said topics within the documentation;
- automatically classifying each of said topics within one or more categories;
- receiving a subject for a virtual book;
- automatically using said topics and said meta-information to compose said virtual book to include a subset of said topics that are relevant to said subject, and each said relevant topic includes a pointer to said associated portion of the documentation, wherein the complete virtual book can be stored for future access.

16. An apparatus for producing a virtual book, comprising:
- a set of electronic documentation files;
- a parsing module configured to automatically gather meta-information representing physical attributes of said electronic documentation;
- a database configured to automatically store said meta-information;
- a topic module configured to automatically identify a set of topics based on said meta-information and the chapter and section headings within said documentation, wherein each said topic comprises a heading appearing in said documentation;
- a structural analysis module configured to automatically determine a hierarchy of said topics within said documentation;
- a categorizer configured to automatically classify a first of said topics into one or more predetermined categories;
- a database configured to automatically store said topics, said hierarchy and said classifications;
- a processor configured to automatically produce a virtual book comprising a subset of said set of topics from said topics and said meta-information, wherein said subset of said topics is relevant to a subject of said virtual book; and
- a storage device for automatically storing said virtual book, wherein the complete virtual book can be stored.

17. The apparatus of claim 16, further comprising a network server configured to present said virtual book to a user.

18. The apparatus of claim 16, further comprising an index module configured to assemble index entries referring to said relevant topics within said documentation.

19. The apparatus of claim 16, wherein said processor is further configured to customize said virtual book on the basis of one of a role of a viewer of said virtual book and a level of experience of the viewer.

20. The apparatus of claim 16, wherein said categories include one or more of the set of: concept, task, example, reference, troubleshooting, role of a viewer of said virtual book and level of experience of the viewer.

* * * * *

UNITED STATES PATENT AND TRADEMARK OFFICE
CERTIFICATE OF CORRECTION

PATENT NO. : 7,139,977 B1
APPLICATION NO. : 09/769927
DATED : November 21, 2006
INVENTOR(S) : John Russell Page 1 of 1

It is certified that error appears in the above-identified patent and that said Letters Patent is hereby corrected as shown below:

Title Page, Item (56), Please Add
References Cited
U.S. Patent Documents

```
6,091,930  A  *  7/2000  Mortimer et al..........................434/362
6,096,096  A  *  8/2000  Murphy et al............................717/175
6,101,515  A  *  8/2000  Wical et al..............................715/531
6,105,044  A  *  8/2000  DeRose et al...........................715/514
6,112,201  A  *  8/2000  Wical, Kelly............................707/5
6,182,095  A  *  1/2001  Leymaster et al........................715/515
```

Signed and Sealed this

Sixth Day of February, 2007

JON W. DUDAS
*Director of the United States Patent and Trademark Office*